United States Patent Office 3,140,933
Patented July 14, 1964

3,140,933
SEPARATION OF AN OXYGEN-NITROGEN MIXTURE
Douglas W. McKee, Buffalo, N.Y., assignor to Union Carbide Corporation, a corporation of New York
No Drawing. Filed Dec. 2, 1960, Ser. No. 73,216
4 Claims. (Cl. 55—68)

This invention relates to the separation of an oxygen-nitrogen mixture, and more specifically relates to an improved process for separating such mixture by contact with an adsorbent material.

The recovery of oxygen from an oxygen-nitrogen mixture such as air is of proven commercial importance, oxygen finding a winding variety of uses such as for the manufacture of steel, welding of metals and for therapeutic employment. This separation is commonly effected by low temperature rectification of air cooled to temperatures near the boiling points of the components, namely $-183°$ C. and $-196°$ C. for oxygen and nitrogen, respectively, at atmospheric pressure. Also, the gas mixture is often compressed to a relatively high pressure such as 2,000 p.s.i. so that refrigeration may be recovered by work expansion of the gas to a lower pressure level and power costs minimized. It will be appreciated that the cooling of air to the $-183°$ C. level requires special refrigeration equipment which is complicated and expensive to operate as well as costly to build. Commonly used refrigeration systems such as those employing the halogenated hydrocarbons and carbon dioxide are not cold enough to reach this temperature level, and it is usually necessary to employ at least part of the separated oxygen and nitrogen components for cooling purposes in low temperature air rectification systems. Another exceedingly expensive and complicated aspect of the prior art air separation systems is the rectification column which usually comprises a large number of liquid-gas contact means such as perforated trays.

Despite these limitations, air separation by low temperature rectification has been found satisfactory where large quantities of oxygen are required such as in the manufacture of steel. However, for relatively small consumption patterns the initial investment or cost of the air separation plant becomes more important relative to power costs than for larger units. For this reason, it is desirable to employ simpler and less expensive systems for small scale uses of oxygen, even though operating costs may be slightly higher. Furthermore, it is always desirable to produce large quantities of oxygen more economically than can be accomplished by conventional low temperature rectification.

To this end, crystalline zeolitic molecular sieve materials have been employed for selective adsorption of nitrogen, but such systems are limited in efficiency by relatively low separation factors.

An object of the present invention is to provide an improved process for separating an oxygen-nitrogen mixture such as air.

Another object is to provide an improved process for oxygen-nitrogen separation which does not require the very cold temperatures normally associated with separation by low temperature rectification.

Still another object of this invention is to provide an improved oxygen-nitrogen separation process which does not require a rectification column or the high pressure normally associated with certain prior art processes.

A further object is to provide an oxygen-nitrogen separation process employing crystalline zeolitic molecular sieve adsorbent material having a higher separation factor than heretofore attained.

A still further object is to provide an oxygen-nitrogen separation process employing crystalline zeolitic molecular sieve adsorbent material which permits relatively high yields of oxygen of desired purity.

Other objects and advantages of the present invention will be apparent from the subsequent disclosure and appended claims.

The separation of mixtures of fluids using zeolitic molecular sieves as selective adsorbents may be accomplished in three fundamentally different modes.

When the physical size and or shape of the molecules of the fluid materials to be separated are sufficiently different and a molecular sieve having a suitable pore size is available a separation is possible based on the acceptance-exclusion phenomenon.

When the physical size and or shape of the molecules to be separated are different and a molecular sieve is available having a pore opening through which the larger molecules pass only with difficulty, a separation is possible which is kinetically controlled. Some such separations are inverse to the separation effected when the molecules all can freely enter the pore system.

When the physical size and or shape of the molecules to be separated are not sufficiently different to either be separated by the acceptance-exclusion phenomenon or the kinetically controlled situation but all freely enter the pore system the separation depends on the forces of adsorption between the molecular sieve and the different molecules.

Some well known and widely practiced separations and purifications of the last mode have involved mixtures of polar and nonpolar molecules. The polar molecules are much more strongly adsorbed than nonpolar molecules and this has been the basis for removing substances such as water and hydrogen sulfide from gases such as air and natural gas.

However, when the molecules of the mixture are non-polar, that is they do not possess a dipole moment, the separation is believed to be effected by a more greatly induced polarization of the more adsorbed molecules over the less adsorbed molecules. While theories have been advanced to explain some such observations, no satisfactory prediction of the degree to which a given separation may be enhanced by modifying the adsorbent has been set forth. It still requires extensive experimentation with the mixtures of molecules to determine the feasibility and extent to which they can be separated.

The separation of mixtures of nitrogen and oxygen gases using zeolitic molecular sieves has been subjected to considerable investigations and several separation processes have been devised. The most practical of these involves the percolation of a mixture, e.g., air, through a fixed bed of a zeolitic molecular sieve having a pore size large enough to accept both the oxygen and nitrogen molecules to adsorb a nitrogen-enriched phase and produce as an effluent an oxygen-enriched phase. Temperatures and pressures have been controlled to give desirable separations. Reactivation of the molecular sieve adsorbent following the separation stage to prepare it for a succeeding separation stage has been effected by means of raising its temperature, reducing the pressure of the gas contacting it, by employing a gaseous purge, or various combinations of these conditions.

Varying the chemical composition of the zeolitic molecular sieve selective adsorbent by ion-exchange of its cations has been contemplated as a means of enlarging or reducing its pore opening, and thereby altering its character as regards the separation. It has now been discovered that the separation of nitrogen and oxygen is greatly influenced by the presence of certain metal cations in the zeolitic molecular sieve in addition to their effect of the enlarging or closing of the pore size.

The preferential adsorption of nitrogen from air by zeolites is due to the strong interaction between the quadrupole moment of the nitrogen molecule and the cation in the zeolite. It has now been discovered that the magnitude depends on the size and charge of the cation.

More specifically, according to the present invention, a process is provided for separating an oxygen-nitrogen gas mixture into its components comprising the steps of providing an oxygen-nitrogen feed mixture, and contacting such feed gas with a bed of crystalline zeolitic molecular sieve material having apparent pore sizes of at least 4 Angstroms and having lithium as at least one of its cations. An oxygen-enriched product gas is then discharged from such bed.

A series of experiments were conducted which vividly illustrate the completely unexpected and remarkably high separation factors attainable by the present invention. In these experiments the ion-exchanged materials used were exchanged with cations of metals from Group I of the Periodic Table. Results are given in Table I, which shows the capacity and separation factor of each adsorbent for a 25% oxygen-75% nitrogen mixture at $-78°$ C. The separation factor $\alpha$, is defined by the relation, $$\alpha = \frac{[N_2] \text{ adsorbed}}{[O_2] \text{ adsorbed}} \times \frac{[O_2] \text{ gas}}{[N_2] \text{ gas}}$$

where $[N_2]$ and $[O_2]$ are the volume concentrations of the gases in the two phases. A value of $\alpha$ greater than 1 indicates selectivity for nitrogen. In the table Zeolite X samples were ion-exchanged to produce the various cation-exchanged forms of Zeolite X which are identified as Li+X, Na+X, etc. In the third column of the table the term "ml. STP/g." is the adsorption loading (capacity) of the mixture of nitrogen and oxygen in the zeolite adsorbent in equilibrium with the stated feed mixture at the stated conditions of temperature and pressure.

TABLE I

*Nitrogen-Oxygen Selectivity of Ion-Exchanged Zeolites, $-78°$ C.*

[25% $O_2$-75% $N_2$ mixture; 1 atm. total pressure]

| Adsorbent | Degree of Exchange, Percent of Initial Cations | Capacity, ml.STP/g. of Activated Zeolite | $\alpha$ Separation Factor |
| --- | --- | --- | --- |
| Li+X | 86 | 111.8 | 7.6 |
| Na+X | 100 | 72.4 | 4.9 |
| K+X | 100 | 58.7 | 2.2 |
| Rb+X | 56 | 30.0 | 3.5 |
| Cs+X | 50 | 26.3 | 1.5 |

It is obvious from these results that lithium cationic exchanged zeolites have a substantially higher nitrogen selectivity than zeolites containing other cations in the alkali metal series. This phenomenon is not completely understood, but believed partly due to the quadrupole moment of the nitrogen molecule. Table I also indicates that lithium zeolites have much higher nitrogen capacity than other members of the same group.

From the practical standpoint, higher nitrogen-oxygen separation factors mean that a smaller size adsorbent bed may be employed to produce a given quantity of oxygen product gas of specified purity.

The term apparent pore size as used herein may be defined as the maximum critical dimension of the molecular species which is adsorbed by the zeolitic molecular sieve in question under normal conditions. The apparent pore size will always be larger than the effective pore diameter, which may be defined as the free diameter of the appropriate silicate ring in the zeolite structure.

The term "zeolite," in general, refers to a group of naturally occurring and synthetic hydrated metal aluminosilicates, many of which are crystalline in structure. There are, however, significant differences between the various synthetic and natural materials in chemical composition, crystal structure and physical properties such as X-ray powder diffraction patterns.

The structure of crystalline zeolitic molecular sieves may be described as an open three-dimensional framework of $SiO_4$ and $AlO_4$ tetrahedra. The tetrahedra are cross-linked by the sharing of oxygen atoms, so that the ratio of oxygen atoms to the total of the aluminum and silicon atoms is equal to two, or $O/(Al+Si)=2$. The negative electro-valence of tetrahedra containing aluminum is balanced by the inclusion within the crystal of cations, for example, alkali metal and alkaline earth metal ions such as sodium, potassium, calcium and magnesium ions. One cation may be exchanged for another by ion-exchange techniques.

The zeolites may be activated by driving off substantially all of the water of hydration. The space remaining in the crystals after activation is available for adsorption of adsorbate molecules having a size, shape and energy which permits entry of the adsorbate molecules into the pores of the molecular sieves.

The zeolites occur as agglomerates of fine crystals or are synthesized as fine powders and are preferably tableted or pelletized for large scale adsorption uses. Pelletizing methods are known which are very satisfactory because the sorptive character of the zeolite, both with regard to selectivity and capacity, remains essentially unchanged.

As explained before, the crystalline zeolitic molecular sieve in order to advantageously be modified for the separation of nitrogen and oxygen must have an apparent pore size large enough to freely accept the molecules of both gases. An apparent pore size of at least about 4 Angstrom units is necessary.

Among the naturally occurring crystalline zeolitic molecular sieves suitable for use in the present invention are chabazite, erionite and faujasite. The natural materials are adequately described in the chemical art. Suitable synthetic zeolitic molecular sieves include zeolites A, D, R, T, X, Y and L. Zeolites such as types X, Y, L and chabazite are particularly useful because of their relatively large pore sizes, and zeolite X is preferred in the practice of this invention because it additionally has a relatively high cation content.

Zeolite A is a crystalline zeolitic molecular sieve which may be represented by the formula:

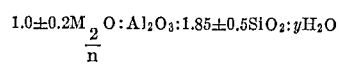

$$1.0 \pm 0.2 \frac{M}{n} O : Al_2O_3 : 1.85 \pm 0.5 SiO_2 : yH_2O$$

wherein M represents a metal, $n$ is the valence of M, and $y$ may have any value up to about 6. The as-synthesized zeolite A contains primarily sodium ions and is designated sodium zeolite A. Zeolite A is described in more detail in U.S. Patent No. 2,882,243, issued April 14, 1959.

Zeolite T is a synthetic crystalline zeolite molecular sieve whose composition may be expressed in terms of oxide mole ratios as follows:

wherein "$x$" is any value from about 0.1 to about 0.8 and "$y$" is any value from about zero to about 8. Further characterization of zeolite T by means of X-ray diffraction techniques is described in copending application Serial No. 733,819, filed May 8, 1958, now U.S. Patent No. 2,950,952, issued August 30, 1960.

Zeolite X is a synthetic crystalline zeolitic molecular sieve which may be represented by the formula:

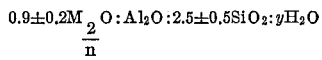

wherein M represents a metal, particularly alkali and alkaline earth metals, $n$ is the valence of M, and $y$ may have any value up to about 8 depending on the identity of M and the degree of hydration of the crystalline zeolite. Sodium zeolite X has an apparent pore size of about 10 Angstrom units. Zeolite X, its X-ray diffraction pattern, its properties, and methods for its preparation are described in detail in U.S. Patent No. 2,882,244, issued April 14, 1959.

Zeolite Y is described and claimed in U.S. patent application Serial No. 728,057, filed April 14, 1958, and in U.S. patent application Serial No. 862,062 filed December 28, 1959, both in the name of D. W. Breck, now both abandoned.

Zeolite L is described and claimed in U.S. patent application Serial No. 711,565, filed January 28, 1958, in the names of D. W. Breck and N. A. Acara, now abandoned.

Zeolite D is described and claimed in U.S. patent application Serial No. 680,383, filed August 26, 1957 in the name of R. M. Milton.

Ion-exchange of the crystalline zeolites is conveniently carried out by percolating a hot, concentrated solution of an appropirate salt through a bed of the zeolite, the degree of exchange varying to some extent upon the cations present. The benefit of the improved selectivity is related to the degree of exchange and one would therefore prefer to have relatively high degrees of exchange approaching 100 percent. This is however not always achievable in crystalline zeolites for various reasons including steric factors attendant with locating a cation appropriately in the structure as well as resistance of the zeolitic anionic structure to the stresses involved. The presence of the lithium cation can improve the nitrogen-oxygen separation factor even though only present to the extent of about 40%.

Activation of the cation modified zeolitic molecular sieves before use may be any method which will remove substantially all of the zeolitic water making the internal voids available for adsorption. Heating at 350° C. in vacuum or in a flowing stream of air is quite satisfactory. In some oxygen-nitrogen separation processes of this invention, vigorous activation is not required since the removal of the zeolite water to an effective extent is inherent in the process.

The present method for improving the performance of a crystalline zeolitic molecular sieve material may be advantageously employed in a number of overall processes for separating oxygen-nitrogen mixtures. For example, as described and claimed in U.S. patent application Serial No. 52,134, filed August 26, 1960, in the names of R. P. Hamlen and K. Kiyonaga, the feed gas may be provided at a feed pressure of between about 0.5 and 5 atmospheres absolute as is a bed of a suitable sieve material such as lithium zeolite X. The feed gas mixture is introduced at the inlet end of the bed and contacted with the molecular sieve material at a temperature between about 0° and $-150°$ C., thereby adsorbing at least most of the nitrogen from the gas mixture. An oxygen product gas is flowed from the bed discharge end, and the nitrogen component is desorbed from the molecular sieve material by evacuating gas therefrom to a second subatmospheric pressure below the feed pressure. This process is suitable for the production from air of 10 tons per day of oxygen in approximately 93% concentration, although the purity of the product depends on the working conditions and amount of argon in the air.

Another process by which the enhanced selectivity of the present ion-exchanged zeolites can be utilized is similar to that previously described, but uses heat to reactivate the adsorbent rather than evacuation. This would be called a thermal rather than a pressure swing cycle. A convenient working range would be $-30$ to $-40°$ C. at 2 atmospheres absolute pressure and a desorption temperature of 100° C.

Because of the high nitrogen-oxygen separation factors and high adsorbate capacity afforded by the present zeolites, the adsorption step may be practiced with reasonable efficiency at ambient temperatures as high as 30° C. In contrast, the previously proposed zeolite systems for air separation usually employ low adsorption temperatures to obtain satisfactory loadings.

Another series of tests were conducted which illustrate the unexpected effect of adsorption temperature on the separation factor for 86% exchanged lithium zeolite X. In these tests a 20% oxygen-80% nitrogen mixture was contacted with the adsorbent, and the results were as follows:

TABLE II

*Nitrogen-Oxygen Selectivity of Lithium Zeolite X for Various Temperatures*

[20% $O_2$–80% $N_2$ mixture, 1 atm. total pressure]

| Temp., ° C. | Separation Factor | Capacity, ml. STP/g. of Activated Zeolite |
|---|---|---|
| $-95$ | 4.9 | 103. |
| $-78$ | {5.3, 5.8, 5.4} 5.5 (Avg.) | {88, 88, 84} 86.7 (Avg.). |
| $-45$ | 6.0 | 44.5. |
| $-32$ | {6.1, 6.6, 7.2} 6.6 | {38, 40, 33} 37.0. |
| 0 | {7.0, 6.6} 6.8 | {18, 22} 20. |

It will be apparent from a study of Table II that the separation factor increases with increasing temperature, which is contrary to adsorbents in general. The capacity shows the normal temperature dependence, i.e., the capacity decreases with increasing temperature. The inverse temperature phenomena could be advantageously utilized in a varying pressure cycle as there will be a temperature rise during the nitrogen adsorption step and a temperature drop during desorption. Using lithium zeolite, the separation factor increases slightly during the adsorption step, and as the bed cools down on desorption, the separation factor decreases making the purging step easier than would otherwise be experienced.

Although preferred embodiments of the invention have been described in detail, it is contemplated that modifications of the process may be made and that some features may be employed without others, all within the spirit and scope of the invention. For example, the oxygen-nitrogen mixture may contain other minor components as for example the usual atmospheric contaminants such as carbon dioxide, moisture and argon.

What is claimed is:

1. A process for separating an oxygen-nitrogen mixture into its components comprising the steps of providing an oxygen-nitrogen containing feed gas mixture at a feed pressure between 0.5 and 5 atmospheres absolute, contacting such feed gas with a bed of crystalline zeolitic molecular sieve material having apparent pore sizes of at least 4 Angstroms and having lithium as at least one cation constituent at a temperature between about 30° and $-150°$ C. thereby adsorbing nitrogen from the gas mixture, and discharging an oxygen-enriched product gas from such bed.

2. A process for separating an oxygen-nitrogen mixture into its components comprising the steps of providing an oxygen-nitrogen containing feed gas mixture at a feed pressure between 0.5 and 5 atmospheres absolute, contacting such feed gas with a bed of lithium zeolite X at a temperature between about 30° and −150° C. thereby adsorbing nitrogen from the gas mixture, and discharging an oxygen-enriched product gas from such bed.

3. A process according to claim 1 in which the feed gas mixture is air.

4. A process according to claim 2 in which the feed gas mixture is air.

References Cited in the file of this patent

UNITED STATES PATENTS

| | | |
|---|---|---|
| 2,882,243 | Milton | Apr. 14, 1959 |
| 2,944,627 | Skarstrom | July 12, 1960 |

FOREIGN PATENTS

| | | |
|---|---|---|
| 555,482 | Canada | Apr. 1, 1958 |
| 777,233 | Great Britain | June 19, 1957 |